United States Patent
Fukutome

(10) Patent No.: US 7,367,882 B2
(45) Date of Patent: May 6, 2008

(54) GAME SYSTEM AND COMPUTER PROGRAM FOR PERMITTING USER SELECTION OF GAME DIFFICULTY AND SETTING OF CONTROL CHARACTER ABILITY PARAMETER

(75) Inventor: Hideaki Fukutome, Tokyo (JP)

(73) Assignee: Konami Corporation, Tokyo (JP)

( * ) Notice: Subject to any disclaimer, the term of this patent is extended or adjusted under 35 U.S.C. 154(b) by 885 days.

(21) Appl. No.: 10/267,361

(22) Filed: Oct. 9, 2002

(65) Prior Publication Data

US 2003/0109297 A1 Jun. 12, 2003

(30) Foreign Application Priority Data

Oct. 11, 2001 (JP) .............................. 2001-314390

(51) Int. Cl.
*G06F 19/00* (2006.01)
(52) U.S. Cl. .............................. 463/7; 463/23; 463/30; 463/40
(58) Field of Classification Search .................... 463/7, 463/30, 40
See application file for complete search history.

(56) References Cited

U.S. PATENT DOCUMENTS

| 4,657,247 | A | * | 4/1987 | Okada | 463/23 |
| 4,679,789 | A | * | 7/1987 | Okada | 463/23 |
| 4,858,930 | A | * | 8/1989 | Sato | 463/23 |
| 5,265,888 | A | * | 11/1993 | Yamamoto et al. | 463/10 |
| RE34,728 | E | * | 9/1994 | Hall-Tipping | 463/23 |
| 5,377,100 | A | * | 12/1994 | Pope et al. | 600/545 |
| 5,683,082 | A | * | 11/1997 | Takemoto et al. | 273/121 B |
| RE36,675 | E | * | 4/2000 | Yamamoto et al. | 463/10 |
| 6,358,148 | B1 | * | 3/2002 | Tanaka | 463/23 |
| 2001/0021665 | A1 | | 9/2001 | Gouji et al. | |
| 2003/0109297 | A1 | * | 6/2003 | Fukutome | 463/7 |

FOREIGN PATENT DOCUMENTS

| EP | 0 945 156 | 9/1999 |
| JP | 09-225141 | 9/1997 |
| JP | 11-179057 | 7/1999 |

(Continued)

OTHER PUBLICATIONS

Super Mario World Instruction Booklet. Nintendo of America, Inc. Aug. 5, 1997.*

(Continued)

*Primary Examiner*—Robert E. Pezzuto
*Assistant Examiner*—Alexander Epshteyn
(74) *Attorney, Agent, or Firm*—Jordan and Hamburg LLP

(57) ABSTRACT

The preset invention provides a game system wherein data is prepared for each stage to execute plural stages separately. When a user has made a predetermined result in one stage, the user progresses to the next stage. The game executes each stage in a predetermined sequence. When a predetermined condition for ability improvement is satisfied, a parameter specifying the ability of a game character is increased. The game allows the user to select one stage from the plural stages out of the predetermined sequence, and the selected stage is executed with the parameter specifying the character ability set to a value below that which would be expected for the selected stage, for example, an initial value for a first stage.

16 Claims, 8 Drawing Sheets

FOREIGN PATENT DOCUMENTS

| | | |
|---|---|---|
| JP | 2001-170365 | 6/2001 |
| JP | 2001-087557 | 4/2003 |

OTHER PUBLICATIONS

The Circlemud Home page. http://www.circlemud.org. Accessed Apr. 19, 2006.*

Experience point. Wikipedia, the free encyclopedia. http://wn.wikipedia.org/wiki/Remorting. Accessed Apr. 19, 2006.*

Remort Snippet. Mar. 15, 2000. http://developer.circlemud.org/contrib/code/players/remort.txt.*

Gran Turismo 2. Gamespot review. Nelson Taruc. Dec. 16, 1999. http://www.gamespot.com/ps/driving/granturismo2/review.html.*

Gran Turismo user manual. Published in 1999 by Sony computer entertainment, Inc.*

Mortal Kombat instruction booklet. Published in 1991 by Nintendo of America, Inc.*

* cited by examiner

GAME SYSTEM AND COMPUTER PROGRAM FOR PERMITTING USER SELECTION OF GAME DIFFICULTY AND SETTING OF CONTROL CHARACTER ABILITY PARAMETER

BACKGROUND OF THE INVENTION

1. Field of Invention

The present invention relates to a game system for executing video games on a computer and a computer program thereof.

2. Disclosure of the Prior Art

In a video-game field, it has been already known that there are games advanced stepwise in units of stages from a one of a lower difficulty level to that of a higher difficulty level. For example, in a shooting-game, a combat plane or the like to be operated by a user is arranged on one side of a map, which is a field, in a first stage. The user makes his/her plane move on the map. At this moment, the player must make his/her plane evade obstructions, e.g. constructions, arranged on the map, missiles shot from the enemy planes appearing on the map, and so on. On the other hand, the user obtains items to make the function of his/her plane improve so that the own plane speeds up, the own missile power increases and so on. These items are arranged on the map or appear by shooting down the enemy planes. The obstructions are constructed, subject to the function of the user's plane improving by getting the items to make the function improved, so that the number of the obstructions increases or the move of which becomes quicker and more complicated as advancing the map. Namely, the game is constituted so that the difficulty level thereof gets higher corresponding to the game's progress. If the game becomes over when his/her plane hits some obstructions halfway, the player must start the game from the first stage again. If a predetermined condition, e.g., his/her plane arrives at the opposite side of the start position, is satisfied, he/she is allowed to advance the game to the next stage.

To satisfy users, game-makers prepare data and programs so that various items to improve the function and obstructions appear on the map to thereby provide elaborate games.

In such games, there is a great difference between the skill of the beginners and the skill of the experienced players. Consequently, if the game is constructed to meet the level of the experienced players, there is a possibility for the beginners to lose their interest immediately because they can progress only to a certain stage. Furthermore, there is a problem they stop playing the game though some contents, not yet played, remain.

On the other hand, if the game is constructed to meet the level of the beginners, the experienced players are not satisfied enough because they can complete the game in a short time. Because of that, for the even experienced players to play for a long time and be satisfied with the game, there is a need for extra-stages for only the experienced players. Therefore, the software developers must design programs and data to realize such stages; thus, there is a problem that the workload of the developers increases.

SUMMARY OF THE INVENTION

It is therefore an object of the present invention to provide a game-system for both the beginners and the experienced players to be satisfied without increasing the workload of the game-software developers and provides a computer program for realizing the game-system.

To solve the above issue, the present invention provides a game system comprising a stage data storing device for storing data prepared for each of a plurality of stages, a sequential-execution control device for making a character to be an operation target advance to a next stage if the character, operated by a user, reaches a predetermined result in one of the stages and executing a game based on the data in each stage in a predetermined sequence; an ability control device for increasing a parameter specifying a character ability every time a predetermined condition to improve the ability is satisfied under the execution control of the game by said sequential-execution control device, the data being constructed so that the lower the parameter, the comparatively higher a difficulty level of the game in each stage is, and on comparing between the plural stages each other, as the later a stage sequence number given to each stage, the comparatively higher the difficulty level of the game is; a stage selecting device for selecting one of the plural stages corresponding to an indication of the user; a select-execution control device for calling the data corresponding to the selected stage and executing the game in at least part of the selected stage; and an ability setting device for setting the parameter at a play-start moment by said select-execution control device to a lower value than an expected value at a play-start moment in the case where the same stage is played under the execution control of said sequential-execution control device.

With respect to the high difficulty level or the low difficulty level, for example, in a shooting game it can be adopted as the high difficulty level where it is hard for the user to operate his/her plane, for example, a lot of enemy planes appear or a lot of missiles are shot from the enemy planes, and as the low difficulty level where it is easy for the user to operate his/her plane, for example, a few enemy planes appear or a few missiles are shot from the enemy planes. As to the condition to improve the predetermined ability, in a shooting game, for example, it can be adopted that the user's plane passes on an item which has an ability to make the speed of the user's plane higher, the missile power bigger, and so on. According to this game system, it is possible to provide for the user the play method for playing the game based on the indications of the user within at least part of the range of an arbitrary stage besides the ordinary play method for playing in the predetermined sequence. When the user plays each stage in the predetermined sequence, the ability of the character which is the operation target is expected to improve as the game advances, on the other hand, the difficulty level of each stage also gets higher gradually. In the case where when the user advances to the next stage, the difficulty level of the stage is extremely high to account for the improvement of the character ability, it is hard for the beginners to advance. Therefore, in order to attract this kind of the users, the difference of the difficulty level between the stages has to be restricted. Because of that, even the beginners can advance the game.

On the other hand, when the user selects an arbitrary stage and plays at least part of the selected stage, the character ability at the play-start moment is set to lower value than the character ability expected if the user plays each stage in the predetermined sequence. Because of that, although the construction of the stage is the same, the user can feel that the difficulty level increases comparatively. As a result, for the experienced players who are not satisfied to play each stage only in the predetermined sequence, it is possible to provide stages that feel more difficult in spite of using the same data. Therefore, according to the present invention, it is possible to provide the game system with which both the beginners and the experienced players are satisfied without increasing the workload of the software developers.

Additionally, in the game system of the present invention, the data may include a part which functions as a program to execute the unique procedure in every stage. The character ability can be also the items the character carries, arms or magic, and so on, besides the something to be expressed as the strength value, for example, a running ability, a physical strength, a walking ability. The meaning of the character includes all things set as the operation objects of the users. The stage need not be called a stage in the game, and it can be something to be recognized as a separated unit on advancing the game. For example, the concept of the stage includes game boards, maps, dungeons, courses, and so on. The difficulty level of each stage can be controlled, for example, by something like the number or the strength of the enemy character which battles with the character as the operation object of the user, or also controlled by the condition to clear the stage. The difference of the difficulty level between the stages, for example, can be set to get higher as the sequence number of the stage is later even though considering the improvement of the ability of the character, which is the operation object of the user. Alternatively, even without considering the improvement of the character ability, if the difficulty level between the stages gets only changed by controlling a unique value to each of various elements constructing the stage like the number of the enemy characters, the strength thereof and so on, the present invention can perform the effect.

In the game system according to the present invention, the ability setting device may set the parameter to an initial value to be given at a play-start moment of a stage of a first place in an execution sequence by the sequential-execution control device, regardless of which stage has been selected.

In this case, if the user selects a stage to play, the character ability which is the operation object is always set to the initial state, namely, the state where the improvement of the ability by the play is ignored completely. It causes that, the later the sequence, the apparent difficulty level of the stage increases extremely so that the experienced players can be made satisfied enough.

The stage selecting device may divide a stage into plural areas and provide an opportunity for the user to select one of the areas, and the select-execution control device may execute the game in the range corresponding to the selected area. In this case, each stage is divided into the smaller areas and the user can select them so that there is no need for the user to play the whole stage. Especially, also while the game in the range corresponding to the selected area is executed, if the parameter is increased when the ability improvement condition is satisfied, in the program to control the improvement in the ability of characters, the ability control device can manage the process in the same way in both of the cases, where the user plays the stages in order and where the user plays the selected stages. Consequently, corresponding to each of the case, there is no need to make separately the program for the improvement in the character ability. Furthermore, because a position stage is divided into smaller areas and the one play range is limited to an area, the character ability set to the initial value, for example, at the play start is not increased too extremely while playing. Therefore, the experienced players are not dissatisfied in the later part of the game. Because of that, both the experienced players and the beginners can be satisfied without increasing the workload of the software developers.

The game system of the present invention may comprise a progress judging device for judging whether a progress of the user has reached a predetermined level under the execution control of the game by the sequential-execution control device, and a select administrating device for forbidding selecting the stage by the stage selecting device and processing corresponding to the selection by the select-execution control device and the ability setting device until the progress judging device judges the progress has reached the predetermined level, and removing the forbidding on at least subject to having been judged that the progress has reached the predetermined level.

In this case, until the progress of the game has reached the predetermined level under the execution control by the sequential-execution control device, it is forbade for the user to select a stage and play it. Because of that, the user cannot select a stage freely and play it before the user plays the game enough under the execution control by the sequential-execution control device, so that it makes possible to avoid the inconvenience that the stage which has the high difficulty level is easily called without the intention of the developers. Furthermore, the select administrating device may judge that the progress has reached the predetermined level when the user makes the predetermined result in all the stages. In this case, the user can not select an arbitrary stage and play it until the user achieves the predetermined result in all the stages. Consequently, the present invention can perform the effect to the user who likes to play the game of the higher level in difficulty after playing all the stages in order.

The game system of the present invention may comprise a model-play data storing device for storing model-play data to replay a model-play as a model for making the character reach the predetermined result in each stage, and a model-play replaying device for displaying the model-play based on the model-play data on the monitor of a display unit within at least part of a range of a particular stage.

In this case, the beginners can find out a hint to achieve a good result by viewing the model-play. This attracts the beginners to the game without making them tired.

The model-play replaying device may display the model-play within the only range the user has already reached under the execution control of the game by the sequential-execution control device. In this case, the contents of the stage the user has not yet reached is not displayed to the user.

The computer program of the present invention solves the above mentioned subject, that is, it makes the computer execute procedures of: a sequential-execution control step for executing a game in a predetermined sequence in each of a plurality of stages based on data prepared for each stage and making a character to be an operation target advance to a next stage if the character operated by a user reaches a predetermined result in one of the stages; and an ability control step for increasing a parameter specifying a character ability every time a predetermined condition to improve the ability is satisfied under the execution control of the game by the sequential-execution control step, and uses the data being constructed so that as the lower the parameter, the comparatively higher a difficulty level of the game in each stage is, and on comparing between the plural stages each other, as the later a sequence number given to each stage, the comparatively higher the difficulty level of the game is, to be used as the data prepared for each of the plural stages, a stage selecting step for selecting one of the plural stages corresponding to an indication of the user; a select-execution control step for calling the data corresponding to the selected stage and executing the game in at least part of the stage; and an ability setting step for setting the parameter at a play-start moment in the select-execution control step to a lower value than an expected value at a play-start moment in the case where the same stage is played under the execution control by the sequential-execution control step.

The computer reads the above program and executes the procedures according to the program so that the program makes the computer function as the game system of the present invention.

The computer program of the present invention may have the preferable embodiment mentioned above. Namely, in the ability setting step, regardless of which stage has been selected, the parameter may be set to the initial value to be given at a play-start moment of a stage of a first place in the execution sequence by the sequential-execution control step. The program may be constructed to make the stage selecting step capable of dividing one stage into plural areas and giving an opportunity for the user to select any one of the areas and the select-execution control step capable of executing the game within a range corresponding to the selected area. The program may be constructed to make the ability control step increase the parameter if the condition of the ability improvement is satisfied even while the game is executed within the range corresponding to the selected area. The computer program may be constructed to make the computer further execute the procedures of a progress judging step for judging whether a progress of the user has reached a predetermined level under the execution control of the game by the sequential-execution control step, and a select administrating step for forbidding selecting the stage by the stage selecting step and processing, corresponding to the selection, in the select-execution control step and the ability setting step until it is judged that the progress has reached the predetermined level in the progress judging step, and removing the forbidding at least subject to having been judged that the progress has reached the predetermined level. The program may be constructed to make the select administrating step judge that the progress has reached the predetermined level when the user makes the predetermined result in all the stages. The computer program may be constructed to make the computer further execute the procedure of a model-play replaying step for referring a model-play data to replay a model-play which is served as a model for making the character reach the predetermined result in each stage and displaying the model-play based on the model-play data on a monitor of the display unit within at least part of a range of a particular stage. The model-play replaying step displays the model-play within an only range the user has already reached under the execution control of the game by said sequential-execution control step.

Furthermore, the program mentioned above to make the computer function as the game system of the present invention may be provided to users as the memory device containing the program and may be distributed to the users with the communication medium regardless of wired or wireless.

DESCRIPTION OF THE PREFERRED EMBODIMENTS

Figure 1:
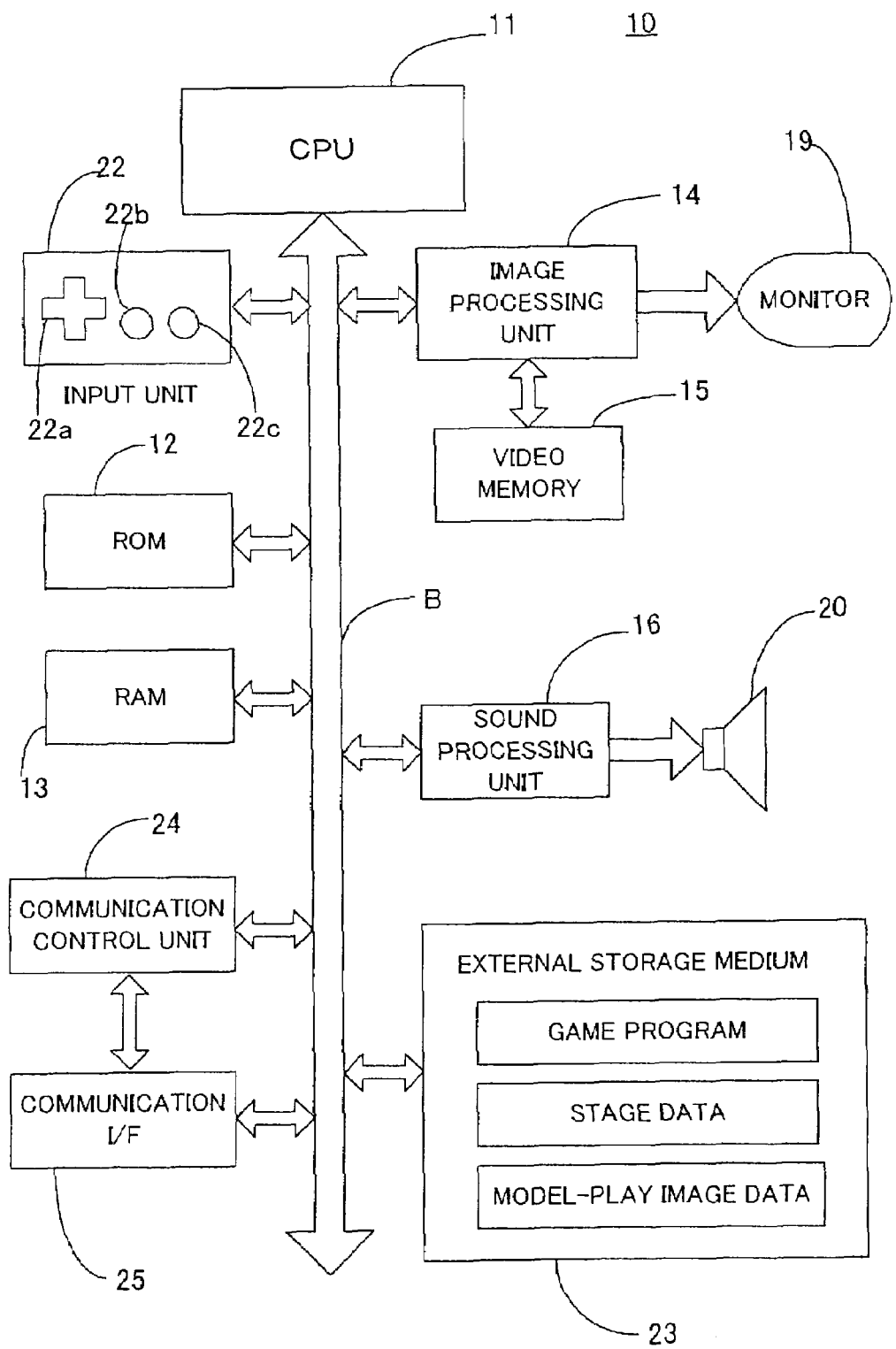
FIG. 1 is a block diagram showing a control system of a game machine according to an embodiment of a present invention.

FIG. 1 is a block diagram showing a control system of a portable game machine constructed as an example of a game system of the present invention. The portable game machine 10 is constructed as a computer executing a predetermined game according to a game program recorded in an external storage medium (for example, a cassette-type memory unit built-in a semi-conductor memory) 23. The game machine 10 comprises a CPU 11 constructed mainly as a microprocessor, a ROM 12 and a RAM 13 as the main memory unit for the CPU 11, and an image processing unit 14 and a sound processing unit 16 to execute a process which is appropriate to an image processing and a sound processing based on an indication from the CPU 11. The operating system as a program needed for a control of all over the game machine is written into the ROM 12. Into the RAM 13, programs and data read from the external storage medium 23 are written as the need arises. An image processing unit 14 renders a predetermined image on a video memory 15 according to the indications from the CPU 11, converts the rendered image data to a predetermined video reproducing signal, and outputs it to the monitor 19. As monitor 19, a liquid crystal monitor is preferable.

A game machine sometimes has the image processing unit 14 function as a graphics accelerator to execute high level calculations for image processing. It is variously changed depending on hardware construction which processes are managed by the CPU 11 or the image processing unit 14. It is showed that the video memory 15 is provided in the image processing unit 14 as a memory only for drawing images, but the video memory can be reserved in the RAM 13 as the main memory. The sound processing unit 16 reproduces data of voice, tune and so on read from the external storage medium 23, or source data etc. to output from a speaker 20.

Furthermore, an input unit 22 and a communication control unit 24 are connected with the CPU 11 via a BUS B. The input unit 22 contains, for example, a cross key 22a and operate buttons 22b, 22c as operation portions. The communication control unit 24 is connected with an appropriate communication device (for example, a cellular phone) via a communication interface 25 and controls data communication via a predetermined network. As the construction mentioned above is only an example, the construction of the game machine, to which the present invention is applied can be changed if needed.

An external storage medium 23 contains various kinds of computer programs for advancing the game on the screen of the monitor 19, stage data specifying content of each stage of the game executed according to the programs, and model-play image data for displaying a model-play on the screen.

Figure 2A:
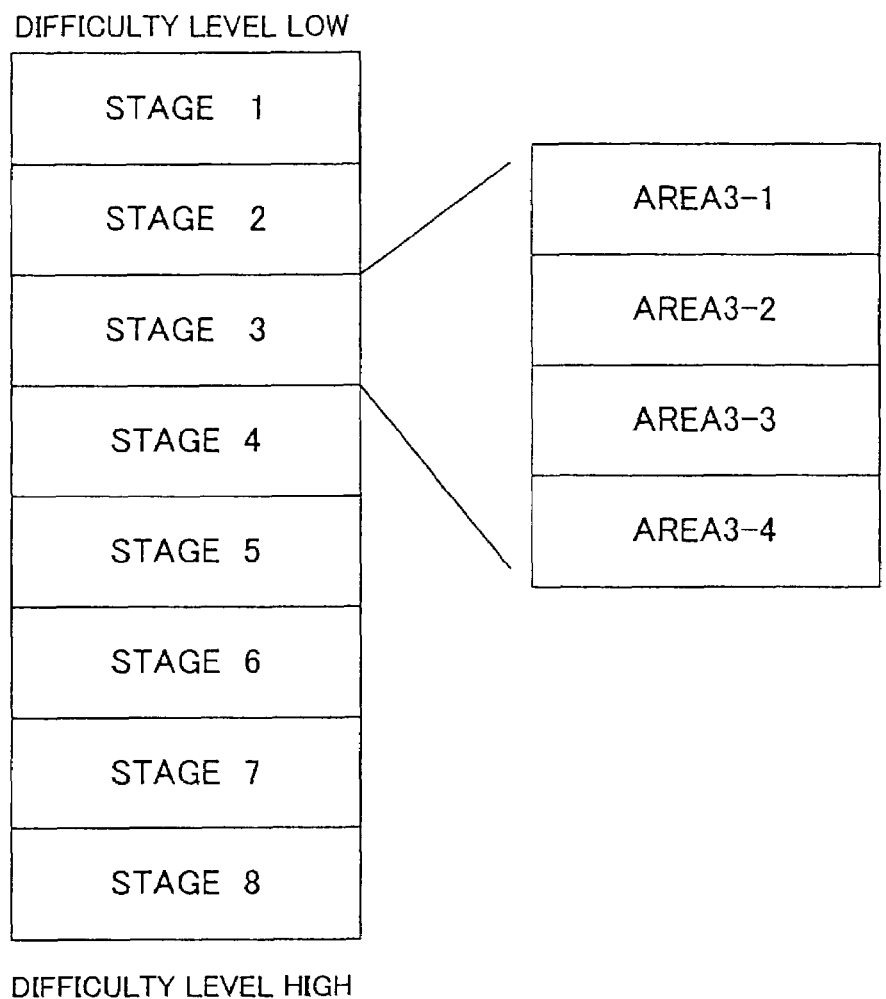
FIGS. 2A and 2B are diagrams showing a structure of data to be referred for advancing a game on the game machine of FIG. 1.

The game program recorded the in the external storage medium 23 is constructed as a program, for example, to execute a shooting game. The shooting game has stages. The stage data recorded in the external storage medium 23, as shown in FIG. 2A, is prepared separately so that each data executes each of the 8 stages from stage 1 to stage 8 of the shooting game. The data for a stage is used to execute a particular stage. The data for each stage are related to each other to make the difficulty level higher gradually as the game advances from stage 1 to stage 8.

Figure 2B:
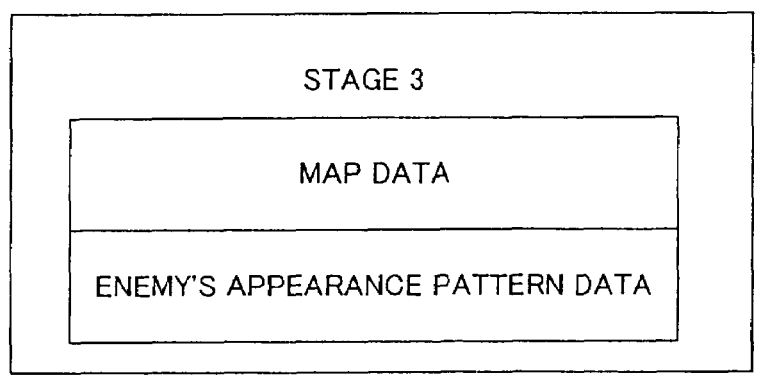

The data of each stage, as shown in FIG. 2B, includes map data and data of the enemy's appearance pattern. The map data is the data for specifying the contents of the game in each stage, and it includes data with respect to positions and the shapes of terrain elements, like mountains and constructions and so on, existing in a range where a character like a battle plane, set as an operation target of a user (hereinafter referred to as "a user character") moves. The data for each stage also includes data designating positions on the map of items to improve ability of the user character. In each stage, if a predetermined condition related to the items is satisfied, for example the user character passes over the items, the parameter specifying the ability of the user character (hereinafter sometimes referred to as the ability parameter) increases, that is, the user character becomes stronger comparatively.

The data of the enemy's appearance pattern includes data specifying various conditions of the character which is the enemy of a user character, like a kind and a number thereof, or a position, a timing, and so on for the enemy character to appear. The difficulty level of each stage is determined comparatively according to a parameter of the ability of the user character, and the number and strength of the enemy character appearing in each stage. As mentioned above, in the game of this embodiment, the conditions to improve the ability parameter of the user character are specified in each stage. The difficulty level of each stage is set so that the user with a usual skill cannot clear the stage if the user doesn't make the ability parameter improve to more than some degree. Namely, the difficulty level of each stage, subjected to the ability parameter of the user character which is expected to improve to some degree in each stage, is controlled so that the level becomes higher as later of the stage sequence.

Figure 3:
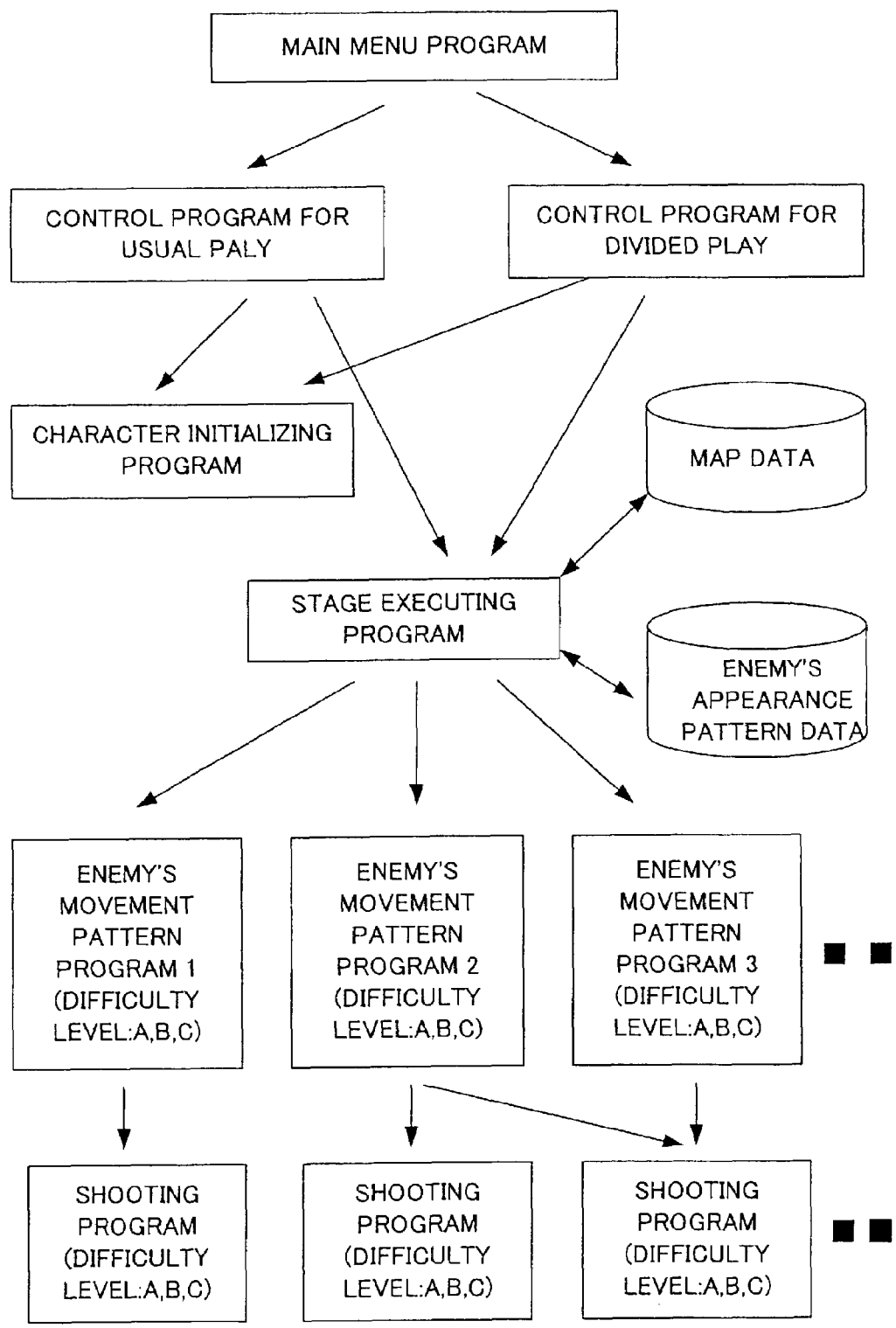
FIG. 3 is a diagram showing an execution procedure of the program that CPU of the game machine of FIG. 1 executes.

FIG. 3 shows a control procedure of the game that the CPU 11 executes according to the program of the game of FIG. 1. Firstly, the CPU 11 executes the program for a main menu and start the game. When the game starts, according to an indication of the user, the CPU 11 selects and executes either a control program for a usual play or a control program for a divided play. The details of the usual play and the divided play are described later.

Whichever program is executed, the usual play or the divided play, the CPU 11 executes a character initiation program to initialize the parameter specifying the ability of the user character. Namely, by the initiation program, the ability of the character is set to an initial value.

After the character initiation program is executed, the CPU 11 also executes a stage execution program. The stage execution program is the program for progressing the game in each stage. According to the stage execution program, the CPU 11 reads the data of the stage to be played next and executes a process to display a map of the stage and the items to improve the ability of the user character on the monitor 19. Also the CPU 11 arranges the user character on the map. Furthermore, while executing the stage, the CPU 11 moves the user character on the map corresponding to operations on the input unit 22 by the user.

Furthermore, the CPU 11 reads data of the enemy character appearance pattern related to the stage being executed at the moment and checks whether a predetermined condition has been satisfied, for example, the user character arrives at the predetermined position. If the condition has been satisfied, a program for the enemy movement pattern corresponding to the enemy specified by the enemy's appearance pattern is executed. The CPU 11 displays the enemy on the monitor 19 according to the program for the enemy movement pattern and displays missiles and so on for the enemy to shoot by executing a program for shooting.

Figure 4:
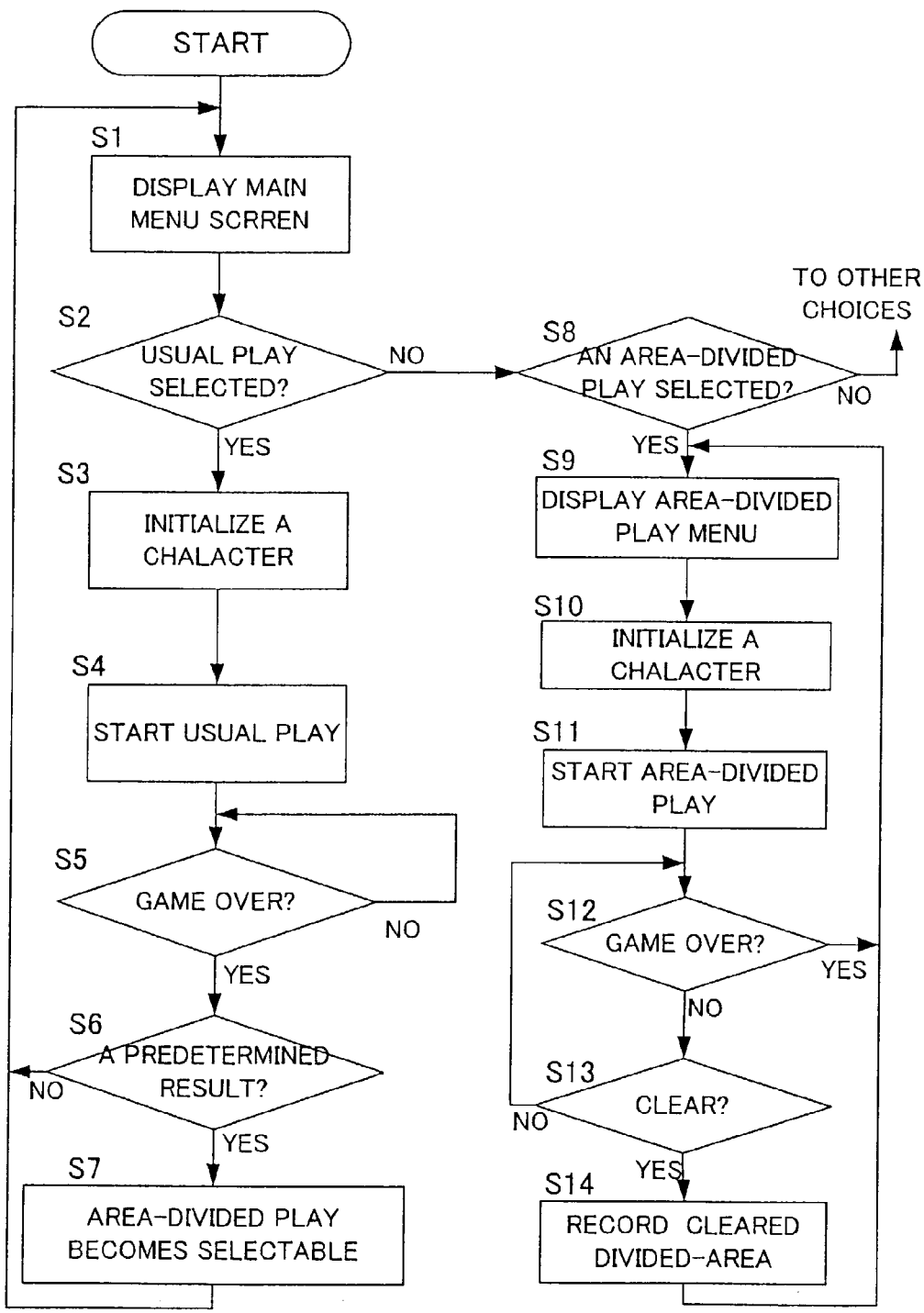
FIG. 4 is a flow chart showing a process that CPU of the game machine of FIG. 1 executes for advancing the game.
Figure 5A:
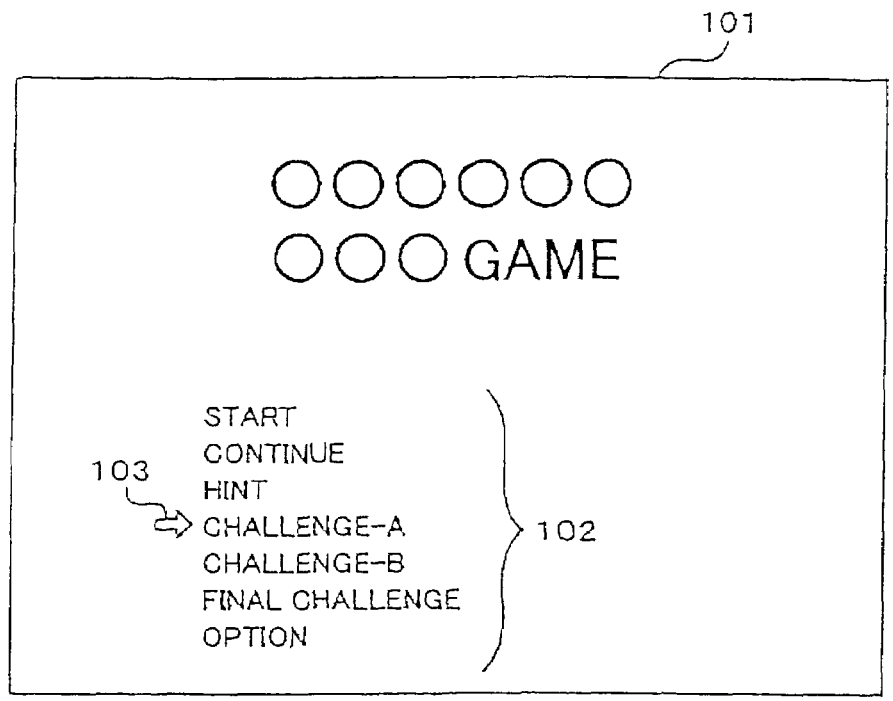
FIGS. 5A and 5B are display examples which appear on a monitor of the game machine of FIG. 1.

The process flow of the game according to the game system of the present invention is explained below referring to FIGS. 4-8. FIG. 4 is a flow chart showing the procedure that the CPU 11 executes for progressing the game. Firstly, the CPU 11 starts the game by executing the program for the main menu and displays a main menu screen 101, as shown in FIG. 5A, on the monitor 19 (step S1). On the main menu screen 101, other than a title, the choices 102 . . . 102 to select a play mode like "START", "CONTINUE", "HINT", and so on, are displayed. The user can move up and down an arrowhead 103 displayed on the left of the choices 102 . . . 102 through the input unit 22 and can select one of the play modes by a predetermined determination operation. However, until the game progress reaches a predetermined level (until a predetermined result is made in the usual play, which is mentioned later), the user cannot select "CHALLENGE-A", "CHALLENGE-B", and "FINAL CHALLENGE". While the user cannot select such the choices, these choices are not displayed on the menu screen 101 or they are displayed more darkly than other choices for the user to recognize that they are impossible to select.

In the state of displaying the main menu screen 101, when the user executes the determination operation on the input unit 22, the CPU 11 judges which choice 102 has been selected. Firstly whether the usual play has been selected or not is judged (step S2), if the user has selected "START", the CPU 11 executes the control program for the usual play.

The usual play is a play mode which requires the user to clear the stages sequentially from the stage 1 which is the lowest difficulty level, to the stage 8 which is the highest difficulty level. When the usual play is selected, the CPU 11 executes the character initiation program to initialize the ability parameter of the character to be operated by the user (step S3). Next, the CPU 11 sets the data designating the game start position of the character referred when the stage execution program is executed to the initiation position of the stage 1 which is the lowest difficulty level. After that, the CPU 11 executes the stage execution program and starts the usual play (step S4).

After that, the CPU 11 refers to the data designating the game start position and starts the game from the start position specified by the data. While the game is going on, if the predetermined condition to improve the ability is satisfied (for example, the user character passes over a predetermined item), the CPU 11 increases the ability parameter. In doing this process, the CPU 11 functions as an ability control device. On the other hand, the CPU 11 judges whether the game is over by judging whether a predetermined game over condition is satisfied (for example, the damage of the user character reaches a predetermined level) (step S5). If the game is not over, the CPU 11 judges whether the present stage is cleared by judging whether a predetermined stage-clear condition, e.g. the user character has shot down the enemy, is satisfied. If the present stage has not been cleared yet, the stage execution program is continued.

If the stage is cleared, the CPU 11 stops the stage execution program temporarily. After setting the value designating the game start position to the initial position of the next stage, the CPU 11 executes the stage execution program again. Subsequently, until it is judged that the game is over in step S5 the game is executed continuously in the same way from the stage 1 to the stage 8. When the stage 8 is cleared, it can be judged as the game-over and the game goes to step S6. The CPU 11 executes the process from step S3 to the game-over; thus, the CPU 11 functions as a sequential-execution control device.

If it is judged as the game-over in step S5, the CPU 11 ends the stage execution program and judges whether the user has gained the predetermined result (step S6). The CPU 11 executes this process; thus, the CPU 11 functions as a progress judging device. For example, the CPU 11 judges whether the user has gained the score higher than a given score (as an example, the extent of the score gained by clearing all the stages). When the user has not got the predetermined result, the CPU 11 ends the control program for usual play and displays again the main menu screen 101 on the monitor 19 (step S1).

If the user has achieved the predetermined result in step S6, the CPU 11a flag showing area-divided play is practicable (step S7). The CPU 11 executes this process; thus, the CPU 11 functions as a selection administrating device. After that, the CPU 11 ends the control program for the usual play and displays the main menu screen 101 on the monitor 19 (step S1). In this case, the CPU 11, by referring to the flag showing the area-divided play is practicable, displays "CHALLENGE-A" with the same tone as the selectable choices. Additionally, the flag showing the area-divided play is practicable may be set when a predetermined stage is cleared.

If the CPU 11 judges that the user doesn't select the usual play in step S2, the CPU 11 judges whether the area-divided play has been selected (step S8). If it is judged that the area-divided play has been selected (that is, the case where the user selects "CHALLENGE-A" on the menu screen 101), the CPU 11 executes the control program for the area-divided play.

Figure 5B:
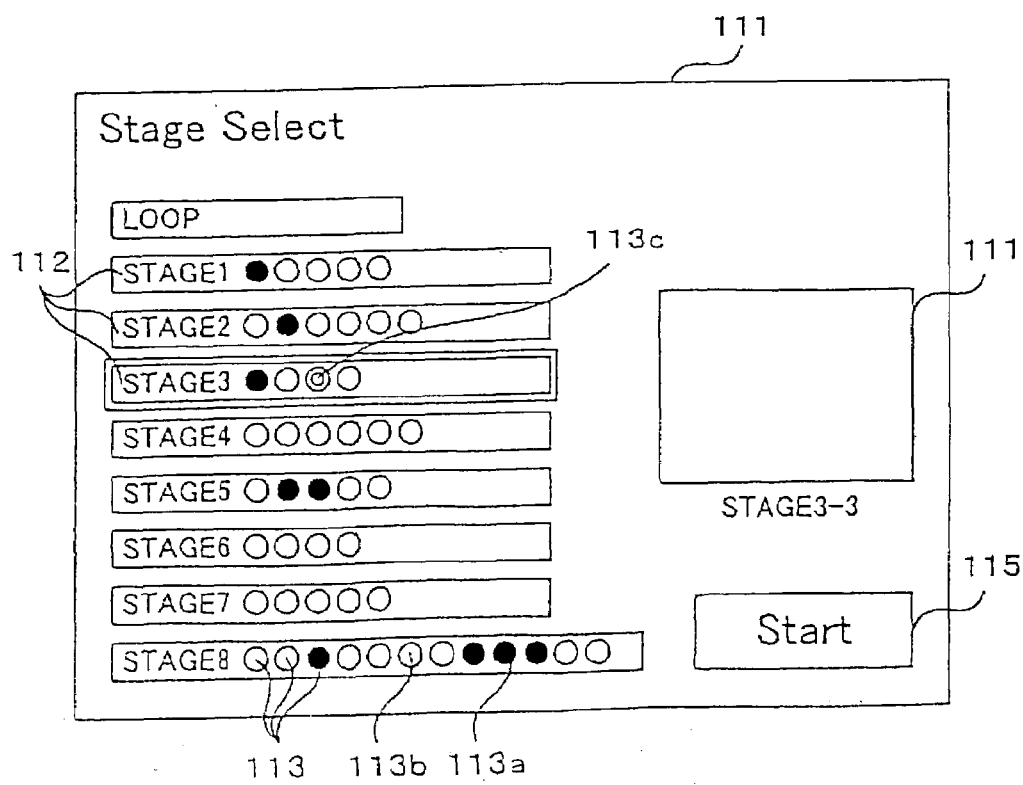

The area-divided play is a play mode where the user selects one of the areas into which the map of each stage is divided and plays the selected area. If the area-divided play is selected, the CPU 11 displays the area-divided-play menu screen 111 as shown in FIG. 5B (step S9 in FIG. 4). The area-divided-play menu contains labels 112 . . . 112 showing each stage name and round items 113 . . . 113 arranged on the right of the label 112. The number of the items arranged on the right of the label 112 . . . 112 is the number of the areas in the stage designated by the label 112. For example, at the stage 3, 4 items 113 are displayed, it means that the map of the stage 3 is divided into 4 areas. The item 113a colored black shows the area has been already cleared in the "CHALLENGE-A" mode, on the contrary the item 113b colored white shows the area has not yet been cleared. The item 113c with the circle shows the item selected at the moment. One cut of the map belonging to the area (area 3-3, in this case) corresponding to this item 113c is displayed on the orthogon 114 in the right center of the area-divided-play menu screen.

When the user selects an arbitrary stage by a predetermined operation, adjusts focus on the "START" button 115 at the lower right in the area-divided-play menu screen, and does determination operation, the CPU 11 executes the character initiation program and initializes the ability parameter of the user character (step S10). Namely, in this mode, the user can select any area belonging to any stage, but in whichever area the user starts playing, the user character is set to the initial value without exception. The initial value corresponds to the ability of the user character at the start of stage 1 in the usual play. On the contrary, the difficulty level of the each stage is set in expectation that the ability of the user character increases by some degree in each stage. Namely, the later the sequence of the stage, the higher the difficulty level is set, corresponding to the improvement of the ability of the user character. In such the setting situation, because the ability of the user character is made to start always from the initial value, it is possible that the user feels the difficulty level is extremely high when the user selects the later stage. The CPU 11 executes the step S10; thus, the CPU 11 functions as an ability setting device.

After executing the character initiation program, the CPU 11 sets the data designating the game start position to the initial position of the area the user has selected in the area-divided menu screen 111. The CPU 11 executes this process; thus, the CPU 11 functions as a stage selecting device. Continuously, the CPU 11 executes the stage execution program and starts the area-divided play (step S11).

During the game, the CPU 11 judges whether the game is over by judging whether the predetermined condition is satisfied, for example the damage of the user character reaches the limit (step S12). When the game is over, the process returns to step 9 and displays the area-divided-play menu screen 111. When the game is not over, the CPU 11 judges whether the area has been cleared by judging whether the user character has reached the end position (the border position to the next area) in the area where the user character is playing at the moment (step S13). When the area is not cleared, the CPU 11 continues the stage execution program. The CPU 11 executes the process from step S1 to the clear; thus, the CPU 11 functions as a select-execution control device.

When the area is cleared, the CPU 11 sets the flag for judging the cleared area (step S14), after that, the process returns to step S9 and displays the area-divided-play menu screen 111 on the monitor 19. At this moment, by referring to the flag made on in step S14, the new cleared area is displayed as the item 113a colored black. The user displays the main menu screen 101 on the monitor 19 by the predetermined operation on the input unit 22, or selects the area to be played next and continuously plays the area-divided play. The order of the judgement of the game over (step S12) and the judgement of the clear (step S13) can be reversed.

When the processes of the CPU 11 are compared between the usual play and the area-divided play mentioned above, they are the same about the processes based on the character initiation program and with respect to the processes based on the stage execution program, only the clear-judgement process is different. Therefore, only when the clear-judgement process of each area in the area-divided play is added to the stage execution program, the usual play and the area-divided play can share the stage execution program, the stage data to execute each stage like the map data, the appearance pattern of the enemy, and so on, the program for the enemy movement pattern, and the shooting program.

Figure 6:
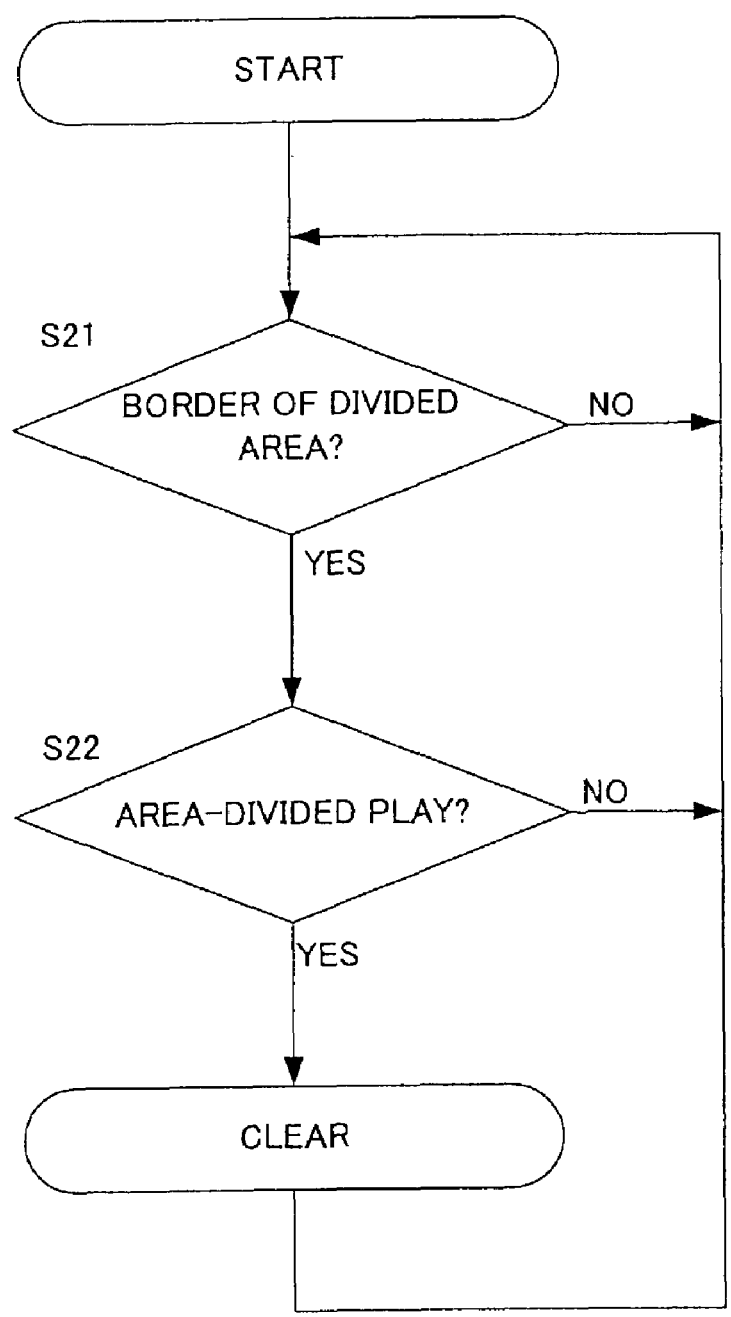
FIG. 6 is a flow chart showing a process that CPU of the game machine of FIG. 1 executes for advancing the game.

With respect to the clear-judgement process of each area in the area-divided play, the CPU 11 only executes the process shown in FIG. 6. Namely, the CPU 11 judges whether the character operated by the user has reached the predetermined position like the border of the area (step S21). If the character has not yet reached the predetermined position, the stage execution program is continuously executed. If the character has reached the predetermined position, the CPU 11 judges whether the present play mode is the area-divided play (step S22). When it is judged that the mode is the area-divided play, the CPU 11 regards it as clear and ends the stage execution program. When it is judged that the mode is not the area-divided play, the CPU 11 continues the stage execution program. Because of that, without actually dividing stage data, the map of the area data can be divided into arbitrary areas substantially.

Additionally, the order of step S21 and step S22 may be reversed, and if it is judged that the mode is the area-divided play, the process may be set so that the clear-judgement process for the usual play is not executed. The game start position and the clear-condition position in the divided play may be set so that the areas overlap each other on the map, or do not adjoin each other thereon.

According to the above mentioned, in the game system of the present invention, the user can select and play an arbitrary area which originally the user can play only after clearing some stages from the stage 1 in sequence, and the player plays the area, the difficulty level of which is set high on the premise that the ability parameter of the character operated by the user improves, with the lower ability than the ability parameter expected for the area. Namely, in the process mentioned above, whichever area the user plays, the parameter specifying the ability of the character at the play start is set to the initial value (step S10).

Accordingly, though the program and the data are the same as the usual play, the user can play the area the difficulty level of which is substantially made higher than the one in the usual play. Therefore, even the experienced players can enjoy a high-difficulty-level game. Furthermore, in the usual play, as the predetermined condition must be satisfied, such as the user gets to the extent of a high score obtained by clearing all the stages, in order to select the area-divided play, there is no possibility that the user who progresses the game slowly in the usual play becomes disinterested in the game by knowing the contents of the following stages. Such a possibility can be removed completely if the game system is constructed so that the user can select the area-divided play only after completely clearing the usual play.

Furthermore, the game system of the present invention can be made still more interesting by including the follow modes.

"OPTION" in the main menu screen 101 (FIG. 5A) is the choice to set the change of the difficulty level by making a change of a speed of the enemy and a number and a speed of the missile the enemy shoots. If the user selects "OPTION", the screen to set the difficulty level appears on the monitor 19, the user can select any one of the levels A to C. These setting changes are reflected to the parameters to be referred in order for the CPU 11, executing the program for the enemy movement pattern and the shooting program, to specify the speed of the enemy and so on.

By combining a difficulty levels A to C and the area-divided play, the play mode of the still higher difficulty level may be prepared. For example, about "CHALLENGE-A" mentioned above, the difficulty level is set to the difficulty level A of the lowest level. If the user clears all areas in "CHALLENGE-A", the CPU 11 sets the flag showing that "CHALLENGE-A" is cleared. According to the flag, when the main menu screen 101 is displayed, "CHALLENGE-B" is displayed as the selectable choice. "CHALLENGE-B" is the divided play and the difficulty level of which is set C.

Additionally, "FINAL CHALLENGE" in the main menu screen 101 is an extra stage and it becomes selectable if the user clears all the areas in "CHALLENGE-B".

"HINT" in the main menu screen 101 is the choice to view the model-play image. Hereinafter, the model-play image is described referring to FIG. 7 and FIG. 8.

Figure 7:
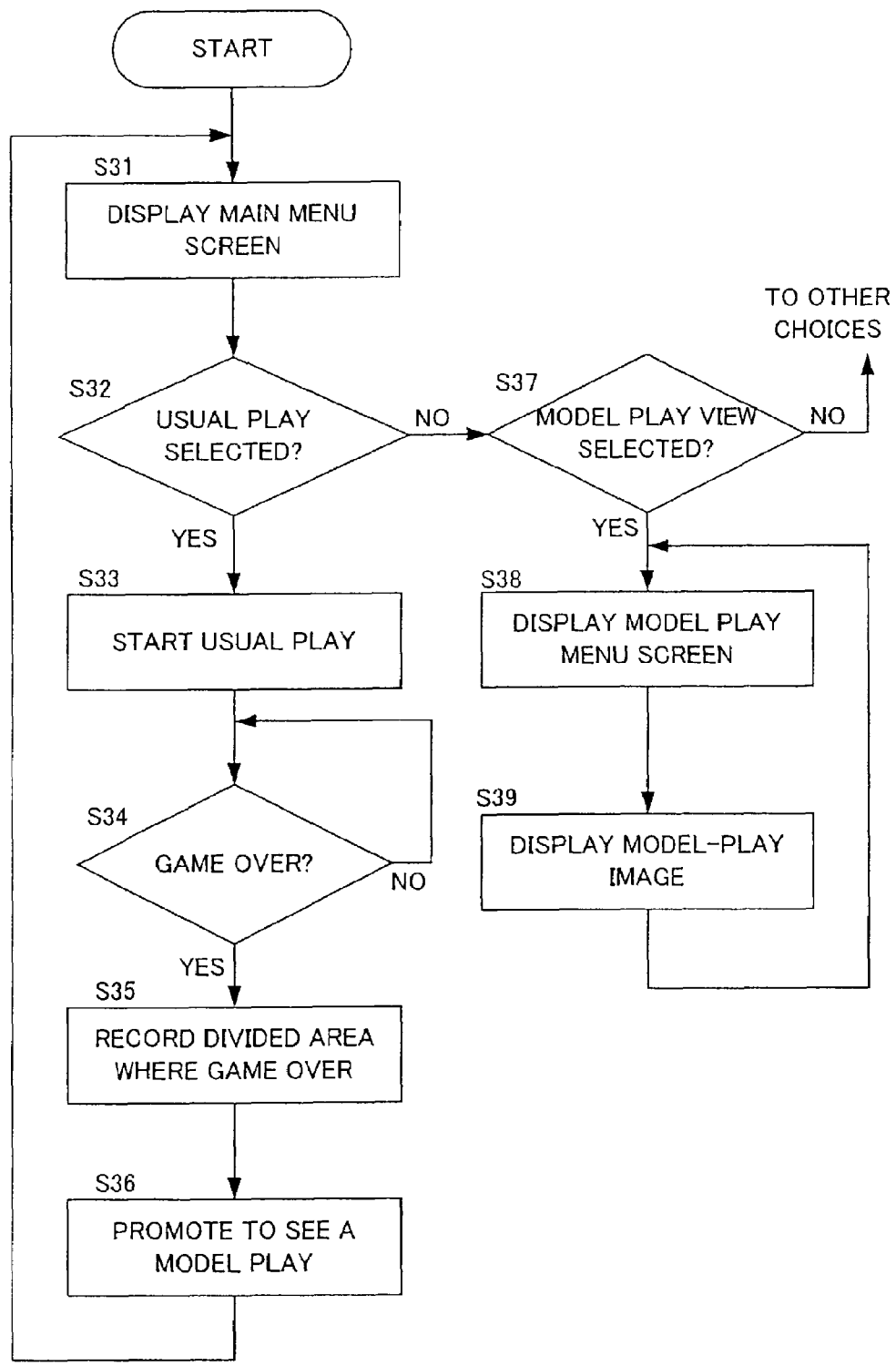
FIG. 7 is a flow chart showing a process that CPU of the game machine of FIG. 1 executes for advancing the game.

FIG. 7 is a flow chat showing the process the CPU 11 executes the model-play image. Firstly, the main menu screen is displayed (step S31), and the CPU 11 judges whether "START" has been selected (step S32). If the CPU 11 judges it has been selected, the usual play is started (step S31). While the game going on, it is judged whether the game is over (step S34), and if the game is not over, the usual play is continued. If the game is over, the flag showing the game-over area is made on (step S35).

Figure 8A:
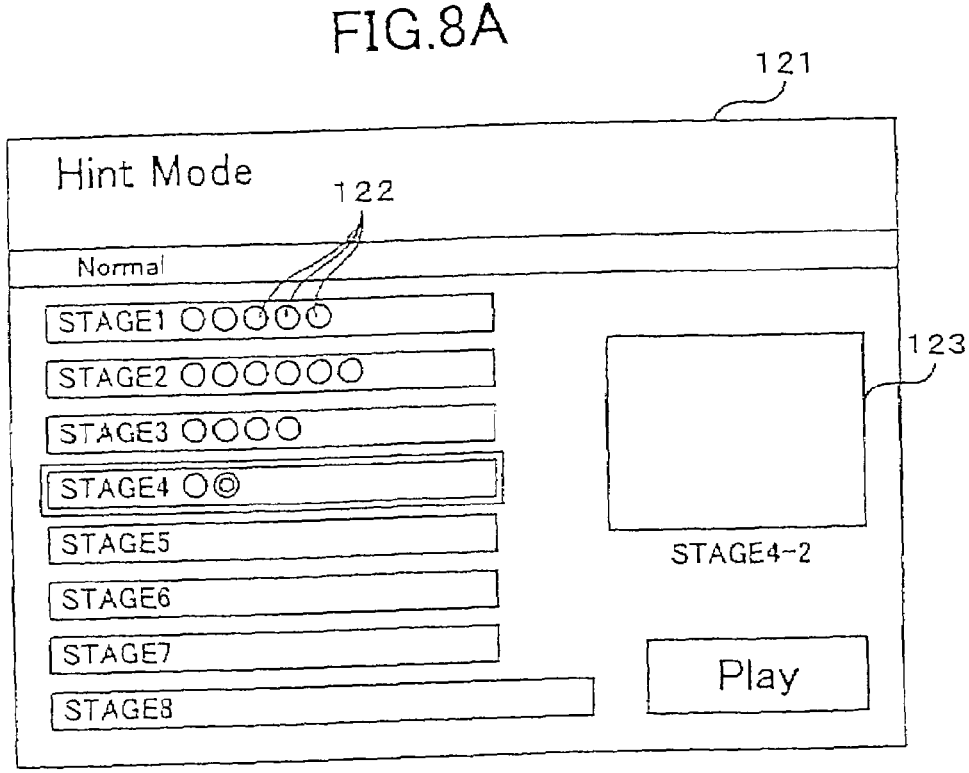
FIGS. 8A and 8B are display examples which appear on the monitor of the game machine of FIG. 1.

Next, the screen, which promotes the user to view the model-play, is displayed on the monitor 19 (step S36). After that, the process returns to step S31, and the main menu screen 101 is displayed. When the CPU 11 judges that the usual play has not been selected in step S32, judges whether "HINT" has been selected (step S37). If it judges not selected, it progresses the process to judge about the other choices. If it judges that "HINT" has been selected, the model-play menu screen 121 for the usual play is displayed as shown in FIG. 8A (step S38).

In the model-play menu screen 121, like the area-divided-play menu screen 111, the items 122 to select an area, the orthogon 123 showing one cut of the selected area, and so on are arranged. However, only the areas are displayed from the first area of the stage 1 to the area where the game is over for the user, so that the areas after the game-over area cannot be selected. After the user selects any one of the selectable areas by the predetermined operation to the input unit 22, if the user adjusts the focus to the "Play" button and does the determination operation, the CPU 11 displays the model-play on the monitor 19 based on the model-play image data recorded in the external storage medium 23 (step S39). The CPU 11 executes this process; thus, the CPU 11 functions as a model-play replaying device.

As viewing the model-play image of the area where the game is over for the user, the user can get the hint to clear the stage in the usual play. Furthermore, also regarding the stage already cleared, the user can find the way to get the higher score. This procedure makes it possible that the beginners are not made bored and are attracted enough to the game. Also, as the model play can be displayed only corresponding to the cleared area, there are no possibilities that they become disinterested in the game by knowing the content of the following stages.

Figure 8B:
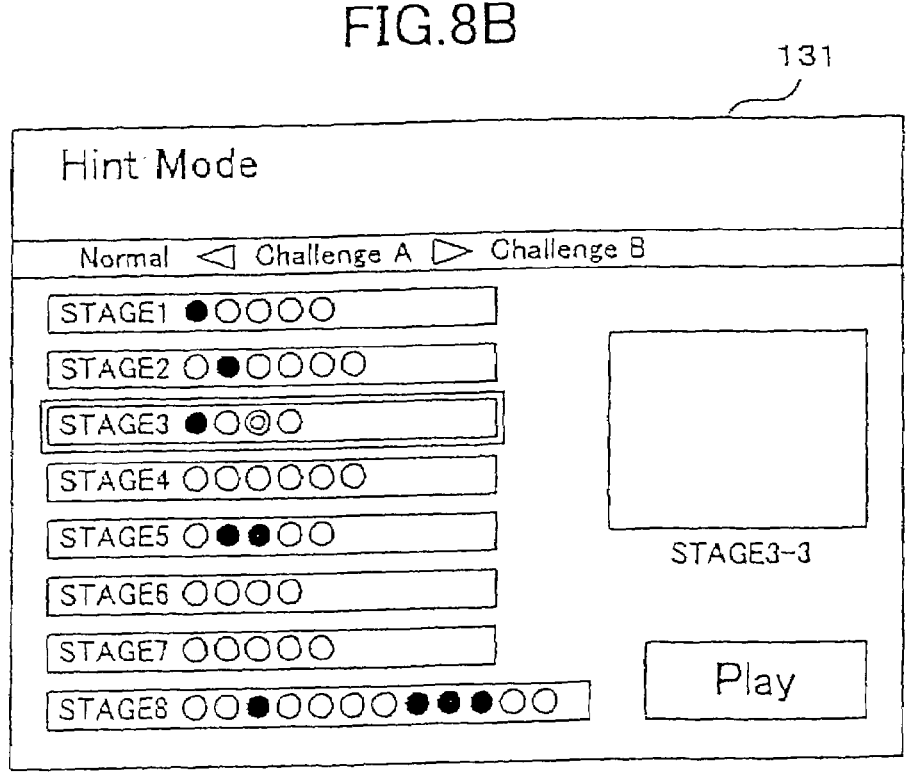

The model-play image data may include the data for the area-divided play. In this case, the CPU 11 refers to the flag showing "CHALLENGE-A" and "CHALLENGE-B" selectable. If they are selectable, the CPU 11 displays the model-play menu screen 131 for the area-divided play as shown in FIG. 8B according to the indication of the user. Although the usual play is the same area as the area-divided play, the comparative difficulty level of the areas for the user character are different, so that the model-plays are also different. Therefore, the user who can clear the usual play but cannot clear the area-divided play can get the hint to clear the area-divided play so that it is possible that such the user is attracted to the area-divided play. As the CPU 11 displays the model-play for the area-divided play only when the flags showing "CHALLENGE-A" and "CHALLENGE-B" selectable are referred and they are selectable, it is not happened that the user who does not clear the usual play finds the contents of the following stages. Furthermore, "CHALLENGE-B" may be set as the extremely difficult play mode even for the experienced players so that, by showing the model-play thereof, it makes possible that the users enjoy the viewing itself of the model-play of such a difficult mode According to the present embodiment, besides the usual play where the user plays the stages sequentially from the stage 1, which is the low difficulty level, to the stage 8 which is the high difficulty level, it is possible that the area-divided play where the user plays the area selected by himself/herself is provided for the user. In the area-divided play, it makes the user select an arbitrary area in the area-divided-play menu screen 111. After the initial position for the game start is set, the stage execution program shared with the usual play is executed. After that, by the process of step S21 and step S22, the play ends at the predetermined position. Whichever area the user selects, the ability parameter of the character at the play start is set to the initial state of the stage 1 in the usual play by the process of step S10. Because of that, though the area constructions are the same, the difficulty level the user feels becomes higher comparatively. As the result of it, by using the same data, it makes possible for the experienced players, who are not satisfied with the game where the stages are only played sequentially, to select freely the area they feel is difficult and play it. Furthermore, by the process of step S39, the user can view the model-play. In this way, according to the present invention, without increasing the workload of the software developers, it is possible that the game system both the beginners and the experienced players are satisfied with is provided.

The present invention is not restricted to the present embodiment, and is capable of executing by various embodiments. For example, the present invention is also applied in the case where each stage is not divided into plural areas and the user can select freely and play the stage he/she likes to play if a predetermined condition is satisfied. Not restricted to be a shooting game, the present invention is also applied to various kinds of games. For example, it is possible that the present invention is applied by regarding maps of role playing games or courses of race games as the "stage". In the race games, if a course is divided into plural sections and the conditions for clearing each section are set to get severer gradually, it is possible that the present invention is applied by regarding each section as the "stage".

In the present embodiment mentioned above, there is no need that the character ability is set always to the initial value when the character plays each stage or area. If the improvement value of the ability parameter expected every time the stage is cleared is specified, the ability parameter at the stage start in the case where each stage is played in sequence is estimated, and the ability parameter is set to the lower value than the estimated value, it makes the difficulty level increased comparatively in sharing the stage data with the usual play.

As explained above, according to the game system and the computer program of the present invention, besides the general play method for playing the stages in a predetermined sequence, it is possible that the play method for playing at least part of range of an arbitrary stage based on the indication of the user is provided for the user. In the later mentioned play method, for the experienced players who are not satisfied only by playing each stage in sequence, it is possible that the stage the experienced players can feel more difficult is provided even with the same data. Namely, without increasing the workload of the software developers, the game system allows both the beginners and the experienced players to be satisfied.

What is claimed:

1. A game system for playing a game involving a character controlled by a user, comprising:
a stage data storing device for storing data prepared for each of a plurality of game stages of the game which have a predetermined sequence and increase in difficulty level based on said predetermined sequence;
a sequential-execution control device for advancing the game to a next game stage of the game stages in response to the character obtaining a predetermined result in one of the stages and executing the game based on the data of each stage in the predetermined sequence;
an ability control device for increasing an ability parameter specifying a character ability every time a predetermined condition to improve the character ability is satisfied, the ability parameter being initialized at a start of the game to an initial ability parameter level, the ability parameter and the difficulty levels of the stages defined by the data for the stages interacting such that apparent difficulty levels of the stages are reduced by increases in the ability parameter specifying the character ability;
a stage selecting device for selecting one of the plural game stages corresponding to an indication of the user;
a selection execution control device for calling the data corresponding to the selected game stage and executing the game in at least part of the selected game stage; and
an ability setting device for reducing the ability parameter of the character to a lower value than a value greater than the initial ability parameter level to which the ability parameter has been increased, the reducing of the ability parameter being automatically effected by said ability setting device based upon said selecting one of the plural game stages corresponding to said indication of the user in place of a game stage determined by said sequential-execution control device such that the selected game stage is executed by the selection execution control device with the ability parameter reduced to the lower value.

2. The game system according to claim 1, wherein said ability setting device reduces the ability parameter to the initial ability parameter level the selected game stage regardless of which game stage has been selected.

3. The game system according to claim 1, wherein:
said stage selecting device is capable of dividing one game stage into plural areas and giving an opportunity for the user to select any one of the areas; and
said selection execution control device is capable of executing the game within a range corresponding to the selected area.

4. The game system according to claim 3, wherein said ability control device increases the ability parameter if the condition to improve the character ability is satisfied while the game is executed within the range corresponding to the selected area.

5. The game system according to claim 1, further comprising:
a progress judging device for judging whether a progress of the user has reached a predetermined level under the execution control of the game by said sequential-execution control device; and
a selection administrating device for disabling selecting the game stage by said stage selecting device and processing corresponding to the selection by said selection execution control device and said ability setting device until said progress judging device judges the progress has reached the predetermined level, and ceasing the disabling at least when the progress judging device judges the progress has reached the predetermined level.

6. The game system according to claim 5, wherein said selection administrating device judges that the progress has reached the predetermined level when the user makes the predetermined result in all the stages.

7. The game system according to claim 1, further comprising:
 a model-play data storing device for storing model-play data to replay a model-play which is a model for making the character reach the predetermined result in each game stage; and
 a model-play replaying device for displaying the model-play based on the model-play data on a monitor of the display unit within at least part of a range of a particular game stage.

8. The game system according to claim 7, wherein said model-play replaying device displays the model-play only for the stages the user has already reached under the execution control of the game by said sequential-execution control device.

9. A storage medium including an executable computer program which configures a computer to execute a game wherein a user controls a character, the program including procedures for:
 storing data prepared for each of a plurality of game stages of the game which have a predetermined sequence and increase in difficulty level based on said predetermined sequence;
 executing the game based on the data of each game stage in the predetermined sequence;
 advancing the game to a next game stage of the game stages in response to the character obtaining a predetermined result in one of the game stages;
 initializing an ability parameter specifying a character ability at a start of the game to an initial ability parameter level;
 increasing the ability parameter specifying a character ability every time a predetermined condition to improve the character ability is satisfied, the ability parameter and the difficulty levels of the game stages defined by the data for the game stages interacting such that apparent difficulty levels of the game stages are reduced by increases in the ability parameter specifying the character ability;
 accepting user input selecting a game stage of the plural game stages which is not a next game stage in accordance with said predetermined sequence;
 reading the data corresponding to the selected game stage;
 reducing the ability parameter of the character to a lower value than a value greater than the initial ability parameter level to which the ability parameter has been increased as an automatic consequence of accepting the user input selecting the selected game stage in place of said executing the game in the predetermined sequence; and
 executing the game in at least part of the selected game stage with the ability parameter of the character set to the lower value.

10. The storage medium according to claim 9, wherein the lower value to which the ability parameter is set is the initial ability parameter level regardless of which game stage the selected game stage is.

11. The storage medium according to claim 9, wherein:
 said accepting user input selecting a game stage of the plural game stages includes dividing one game stage into plural areas and giving an opportunity for the user to select any one of the areas; and
 said executing the game in at least part of the selected game stage includes executing the game within a range corresponding to the selected area.

12. The storage medium according to claim 11, wherein said executing the game in at least part of the selected game stage includes increasing the ability parameter each time a predetermined condition to improve the character ability is satisfied.

13. The storage medium according to claim 9, wherein the program further comprises procedures for:
 judging whether a progress of the user has reached a predetermined level while the game stages are executed in the predetermined sequence;
 preventing said accepting user input selecting a game stage when the user has not reached said predetermined level; and
 permitting said accepting user input selecting a game stage when the user has reached said predetermined level.

14. The storage medium according to claim 13, where said predetermined level is that the user makes the predetermined result in all the game stages.

15. The storage medium according to claim 9, wherein the program further comprises procedures for:
 reading model-play data wherein the model-play includes a model for displaying making the character reach the predetermined result in each of the game stages; and
 displaying the model-play based on the model-play data on a monitor within at least part of a range of a particular game stage of the game stages.

16. The storage medium according to claim 15, wherein said particular game stage of the game stages is limited to game stages in which the user has reached in accordance with the predetermined sequence of the game stages.

* * * * *